G. W. ATKINSON.
STEAM COOKER.
APPLICATION FILED FEB. 3, 1921.
1,400,475.
Patented Dec. 13, 1921.
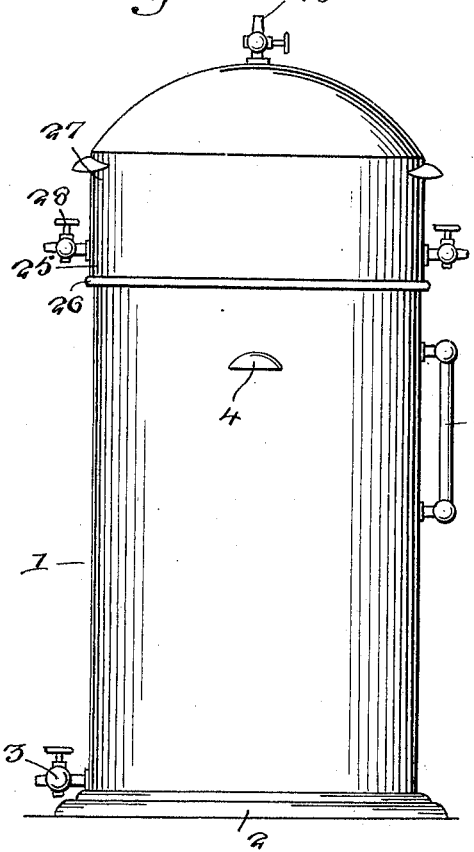
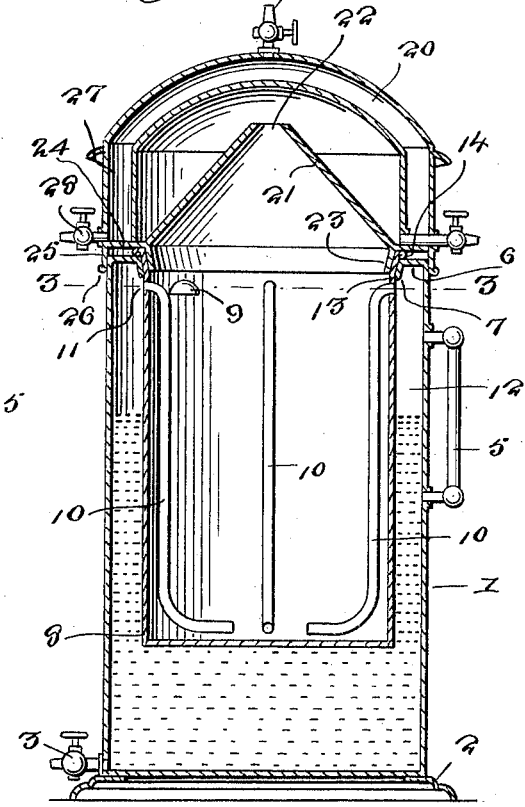
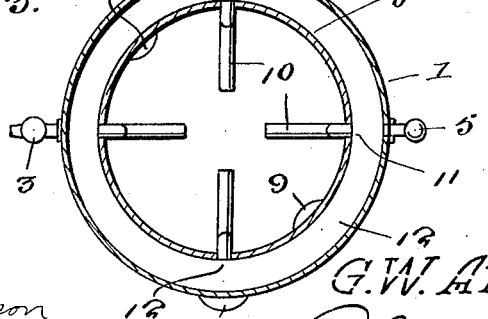
Witnesses:
Robert E. Davidson
Lawrence Schlosser
Inventor
G. W. ATKINSON.
By Clarence A. O'Brien,
Attorney

UNITED STATES PATENT OFFICE.

GEORGE W. ATKINSON, OF LOUISA, KENTUCKY.

STEAM-COOKER.

1,400,475.     Specification of Letters Patent.     Patented Dec. 13, 1921.

Application filed February 3, 1921. Serial No. 442,171.

*To all whom it may concern:*

Be it known that I, GEORGE W. ATKINSON, a citizen of the United States, residing at Louisa, in the county of Lawrence and State of Kentucky, have invented new and useful Improvements in Steam-Cookers, of which the following is a specification.

The object of my present invention is the provision of a steam cooker that is simple and inexpensive in construction, susceptible of being readily and thoroughly cleaned, and possessed of a wide range of usefulness.

To the attainment of the foregoing, the invention consists in the improvement as hereinafter described and definitely claimed.

In the accompanying drawings, forming part hereof:—

Figure 1 is a side elevation of my novel cooker.

Fig. 2 is a vertical diametrical section of the same.

Fig. 3 is a horizontal section on the line 3—3 of Fig. 2.

Similar numerals designate corresponding parts in all of the views of the drawings.

Among other elements my novel cooker comprises a boiler 1. This boiler is provided with a base 2, valved inlet 3 for water, exterior handles 4, and a water gage 5. It is open at its upper end, being there provided with an inwardly extending annular flange 6 which merges into an inwardly-inclined annular skirt 7.

The cooker also comprises a can 8, preferably of copper, removable through the flanged opening of the boiler and supported in working position and in steam-tight manner by the annular skirt 7. The said can is equipped with interior handles 9, and interior pipes 10, the latter also preferably of copper and having their lower ends grouped about the center of the bottom of the can 8 so as to discharge at substantially the lowermost part of the center of the can the steam received at the points 11 from the steam space 12 of the boiler. At its upper end the can 8 is entirely open, and on said end is an annular inclined portion 13 to fit frictionally in steam-tight manner in the skirt 7 of the boiler. Said portion 13 is provided at its upper end with a rolled rim 14 to rest on the boiler flange 6.

Removably superimposed on the can 8 and closing the upper end thereof is the condenser head of the cooker. This condenser head includes a water jacket 20 and a cone 21 open at its upper end 22, said cone having at its lower end an inwardly inclined annular flange 23 to seat in steam-tight manner in the can portion 13, and also having an outwardly directed flange 24 that forms the bottom of the water jacket 20 and carries a skirt 25 with a rolled rim 26 to snugly receive the upper end of the boiler 1. At 27 the condenser head is equipped with exterior handles; and it is also furnished with a valved water inlet 28 for the water jacket 20, and a valved vent 29 also in connection with the water jacket, as well as with a valved outlet for the water of condensation that collects in the head about the base of the cone 21.

It will be apparent from the foregoing that my novel cooker may be used to advantage for cooking food as well as for the advantageous making of coffee, tea, chemically-pure water, and extracts, chemicals and medicinal preparations; also, that the parts are adapted to be readily assembled and disassembled so that the cooker as a whole may be quickly and completely cleaned.

Having described my invention, what I claim and desire to secure by Letters-Patent, is:—

1. A steam cooker comprising a boiler having at its upper end an inwardly directed annular flange on the inner edge of which is an inwardly-inclined annular skirt, a can removably arranged in the boiler and having an inwardly-inclined annular upper portion seated in said skirt of the boiler and also having means to conduct steam from the steam space of the boiler to the lower portion of the interior of the can, and a condenser head having an inwardly-inclined flange removably seated in said annular portion of the can and also having a water jacket and an interior cone and valved outlet for water of condensation.

2. A steam cooker comprising a boiler having at its upper end an inwardly directed annular flange on the inner edge of which is an inwardly-inclined annular skirt, a can removably arranged in the boiler and having an inwardly-inclined annular upper portion seated in said skirt of the boiler and also having means to conduct steam from the steam space of the boiler to the lower portion of the interior of the can, and a condenser head having an inwardly-inclined flange removably seated in said annular portion of the can and also having a water jacket and an interior cone and valved outlet for water of condensation; the said can being provided adjacent to its upper end with interior handles, whereby it may be conveniently lifted from the boiler.

In testimony whereof, I affix my signature.

GEORGE W. ATKINSON.